United States Patent
Heeter et al.

(10) Patent No.: US 12,510,029 B1
(45) Date of Patent: Dec. 30, 2025

(54) ELECTRIC GENERATOR IN TURBINE ENGINE

(71) Applicants: Rolls-Royce North American Technologies, Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Jordan Thralls, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/988,283

(22) Filed: Dec. 19, 2024

(51) Int. Cl.
*F02C 7/32* (2006.01)
*F02C 6/00* (2006.01)
*F02C 6/20* (2006.01)
*H02K 7/18* (2006.01)

(52) U.S. Cl.
CPC .................. *F02C 7/32* (2013.01); *F02C 6/00* (2013.01); *F02C 6/20* (2013.01); *H02K 7/1823* (2013.01)

(58) Field of Classification Search
CPC ..... F02C 7/32; F02C 6/00; F02C 6/20; H02K 7/1823
See application file for complete search history.

(56) References Cited

U.S. PATENT DOCUMENTS

| | | | |
|---|---|---|---|
| 4,043,121 A | 8/1977 | Thomas et al. | |
| 5,867,980 A | 2/1999 | Bartos | |
| 7,140,174 B2 | 11/2006 | Johnson | |
| 7,216,475 B2 | 5/2007 | Johnson | |
| 7,246,484 B2 | 7/2007 | Giffin, III et al. | |
| 7,395,657 B2 | 7/2008 | Johnson | |
| 7,475,545 B2 | 1/2009 | Johnson | |
| 7,514,810 B2 | 4/2009 | Kern et al. | |
| 7,631,484 B2 | 12/2009 | Giffin et al. | |
| 7,758,303 B1 | 7/2010 | Wadia et al. | |
| 7,926,290 B2 | 4/2011 | Johnson | |
| 7,952,244 B2 | 5/2011 | Colin | |
| 8,695,324 B2 | 4/2014 | Giffin et al. | |
| 8,789,376 B2 | 7/2014 | Coffinberry | |

(Continued)

OTHER PUBLICATIONS

U.S. Appl. No. 18/988,165, filed Dec. 19, 2024, naming inventors Heeter et al.

(Continued)

*Primary Examiner* — Joseph Ortega
(74) *Attorney, Agent, or Firm* — Shumaker & Sieffert, P.A.

(57) ABSTRACT

A turbine engine includes at least one turbine, combustion equipment, and at least one compressor. The at least one compressor includes a compressor stage. The compressor stage includes a plurality of compressor blades configured to input work into a core airflow flowing through the turbine engine. The turbine engine includes an electrical generator. The electrical generator includes a rotor carried on an outer diameter of the plurality of compressor blades of the compressor stage and mechanically rotated by the plurality of compressor blades of the compressor stage and configured to rotate about a longitudinal axis of the turbine engine. The electrical generator further includes a stator.

18 Claims, 8 Drawing Sheets

(56) References Cited

U.S. PATENT DOCUMENTS

| | | |
|---|---|---|
| 9,016,041 B2 | 4/2015 | Baughman et al. |
| 11,131,208 B2 | 9/2021 | Auker et al. |
| 11,788,428 B2 * | 10/2023 | Simonetti ............ H02K 7/1823 |
| | | 290/52 |
| 2011/0120083 A1 | 5/2011 | Giffin et al. |
| 2011/0167792 A1 | 7/2011 | Johnson et al. |
| 2011/0171007 A1 | 7/2011 | Johnson et al. |
| 2016/0319845 A1 * | 11/2016 | Molnar ................ F04D 29/324 |
| 2020/0102914 A1 * | 4/2020 | Moss ...................... F01D 15/10 |
| 2021/0164392 A1 | 6/2021 | Harvey |
| 2024/0322646 A1 | 9/2024 | Molnar, Jr. et al. |
| 2024/0410293 A1 | 12/2024 | Molnar, Jr. et al. |

OTHER PUBLICATIONS

U.S. Appl. No. 19/339,074, filed Sep. 24, 2025, naming inventors Heeter et al.

* cited by examiner

ELECTRIC GENERATOR IN TURBINE ENGINE

TECHNICAL FIELD

This disclosure relates to electrical power generation in turbine engines.

BACKGROUND

A turbine engine is a type of internal combustion engine that may drive an electric generator for converting mechanical power produced by the turbine engine to electrical power used by other components of a system. Some applications (e.g., due to size and weight restrictions) may require the electric generator to be located within the housing of the turbine engine. During operation, some internally-located electric generators may produce excess heat that may interfere with operations being performed by the electric generator and/or other collocated components of the turbine engine. In addition, performing maintenance or inspections of some internally-located electric generators may be difficult as other collocated components of the turbine engine obstruct access to the electric generator.

SUMMARY

Recently, demand for electrical power on vehicles (e.g., aircraft and others) has increased. For example, larger electronics and/or hybrid consideration has encouraged incorporation of new or additional electrical generator capability on turbine engines, including turbofans. Electrical generators may be positioned at various locations on turbine engines. As one example, an electrical generator may be positioned in a compressor section of a gas turbine engine.

An electrical generator positioned in the compressor section of a turbine engine may be advantageous when compared to other positions. For example, temperatures in the front of a compressor section may be relatively low, which may yield favorable generator performance. An electrical generator positioned in the compressor section may enable a turbine engine to include relatively larger and/or relatively more efficient electrical generators. However, still further improvements in turbine engine performance and electrical generator performance may be desired. Reducing overall weight of turbine engine generally enables performance improvement of the aircraft. Reducing the operating temperature of an electrical generator generally enables performance improvement of the electrical generator.

Turbine engines according to the present disclosure may address one or more of these challenges. In accordance with one or more examples of the present disclosure, an electrical generator is positioned in a compressor section of the turbine engine. A rotor of the electrical generator may be carried on an outer diameter of a plurality of compressor blades of a compressor stage. The rotor of the electrical generator is driven by the compressor blades while the compressor is in operation. In this way, electrical generators according to the present disclosure may be positioned in the compressor section and may make an additional use of the compressor blades of a compressor stage to drive a rotor of the electrical generator. Thus, the electrical generator may add relatively little weight and/or take up relatively little space when compared to other electrical generators, which may enable performance improvements to the electrical generator or the turbine engine overall.

In accordance with one or more aspects of the present disclosure, a turbine engine includes at least one turbine, a combustor, and at least one compressor. The at least one compressor includes a compressor stage. The compressor stage includes a plurality of compressor blades configured to input work into a core airflow flowing through the turbine engine. The turbine engine includes an electrical generator. The electrical generator includes a rotor mechanically rotated by the plurality of compressor blades of the compressor stage and configured to rotate about a longitudinal axis of the turbine engine. The electrical generator further includes a stator.

In accordance with one or more aspects of the present disclosure, an airframe includes one or more turbine engines. A first turbine of the one or more turbine engines includes at least one turbine, combustion equipment, and at least one compressor. The at least one compressor includes a compressor stage. The compressor stage includes a plurality of compressor blades configured to input work into a core airflow flowing through the turbine engine. The turbine engine includes an electrical generator. The electrical generator includes a rotor mechanically rotated by the plurality of compressor blades of the compressor stage and configured to rotate about a longitudinal axis of the turbine engine. The electrical generator further includes a stator.

The details of one or more examples are set forth in the accompanying drawings and the description below. Other features, objects, and advantages will be apparent from the description and drawings, and from the claims.

DETAILED DESCRIPTION

Figure 1:
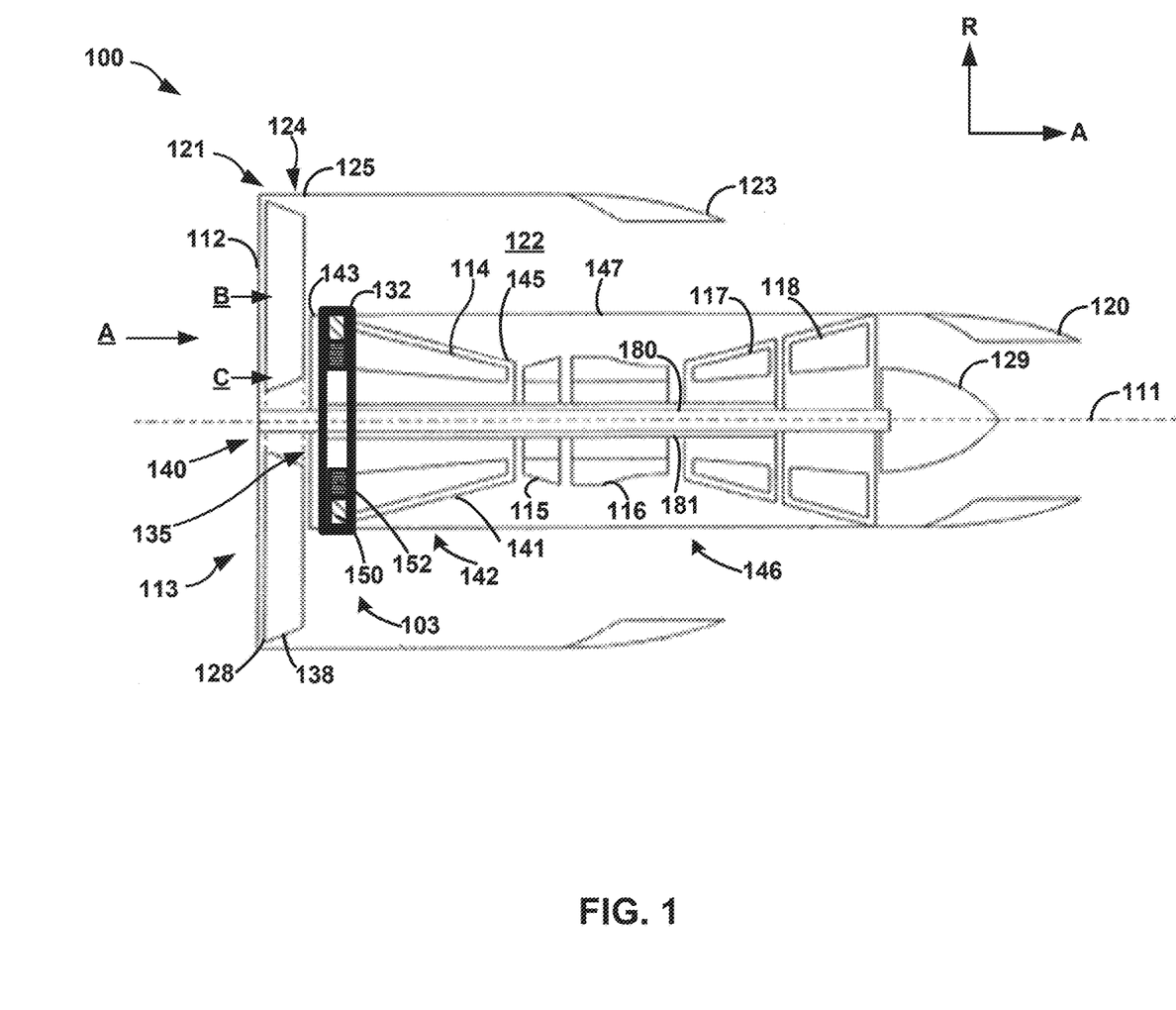
FIG. 1 is a conceptual diagram illustrating a cross-section of an example turbine engine with an electric generator for producing electrical power located in a compressor section, in accordance with one or more aspects of this disclosure

FIG. 1 is a conceptual diagram illustrating a cross-section of turbine engine 100 with an electric generator 132 for producing electrical power, in accordance with one or more techniques of this disclosure. Turbine engine 100 may be configured to convert one form of power to mechanical energy in the form of a rotating turbine. The mechanical energy produced by turbine engine 100 may be used in a variety of ways or for a variety of systems and applications (e.g., aircraft, locomotives, watercraft, power plants, electric generators, and any or all other systems and applications that rely on mechanical energy from a turbine engine to perform work). As illustrated in FIG. 1, turbine engine 100 may be a ducted fan gas-turbine engine, which may be used to propel an aircraft.

Turbine engine 100 may be a primary propulsion engine that provides thrust for flight operations of an aircraft. In the example of FIG. 1, turbine engine 100 is a two-spool engine having low-pressure (LP) spool (rotor) 180 and high-pressure (HP) spool (rotor) 181. In other embodiments, turbine engine 100 may include three or more spools, e.g., may include an IP spool and/or other spools and/or partial spools, e.g., on-axis or off-axis compressor and/or turbine stages (i.e., stages that rotate about an axis that is the same or different than that of the primary spool(s)). In one form, turbine engine 100 is a turbofan engine. In other embodiments, turbine engine 100 may be any other type of gas-turbine engine, such as a turboprop engine, a turboshaft engine, a propfan engine, a turbojet engine or a hybrid or combined cycle engine. As a turbofan engine, low-pressure spool 180 is operative to drive propulsor 113 in the form of fan 138. Fan 138 may thus be considered a low-pressure compressor in the illustrated example. In an example of a turboprop engine, low-pressure spool 180 may drive propulsor 113 in the form of a propeller system (not shown), e.g., via a reduction gearbox (not shown). In other embodiments, propulsor 113 may take other forms, such as one or more helicopter rotors or tilt-wing aircraft rotors, for example, powered by one or more turbine engines 100 in the form of one or more turboshaft engines.

As shown in FIG. 1, turbine engine 100 has a principle and rotational longitudinal axis 111. Turbine engine 100 may include, in axial flow series, air intake 112, fan 138, high-pressure compressor 114, diffuser 115, combustor 116, low-pressure turbine 117, high-pressure turbine 119 and core exhaust nozzle 120. Turbine engine 100 may include nacelle 121, which may generally surround turbine engine 100 and defines intake 112, bypass duct 122 and an exhaust nozzle 123. Turbine engine 100 may include center-plug 129 is positioned within the core exhaust nozzle 120 to provide a form for the core gas flow C to expand against and to smooth its flow from the core engine.

Turbine engine 100 may operate such that inlet air A entering the intake 112 is accelerated by fan 113 and bifurcated by casing 141 to produce two air flows: a first airflow C (i.e., "core airflow") into high-pressure compressor 114 and a second airflow B (i.e., "bypass airflow") which passes through bypass duct 122 to provide propulsive thrust. Casing 141 may surround core airflow C and guide core airflow C through turbine engine 100. Casing 141 may include one or more components. For example, casing 141 may include splitter casing 143 which bifurcates inlet airflow A and core casing 145 which surrounds the core section. Casing 141 may include additional components in other examples, such as an intermediate casing positioned between splitter casing 143 and core casing 145.

Turbine engine 100 may be a high-bypass engine (e.g., a ratio of B to C is greater than a threshold ratio) or a low-bypass engine (e.g., a ratio of B to C is less than the threshold ratio). High-pressure compressor 114 may compress core airflow C directed into it before delivering that air to diffuser 115, where core airflow C is prepared for combustion by combustor 116.

The compressed air exhausted from diffuser 115 may be directed into combustor 116 where it is mixed with fuel and the mixture combusted. The resultant hot combustion products may then expand through, and thereby drive the high and low-pressure turbines 117, 118 before being exhausted through core exhaust nozzle 120 (and may thereby provide additional propulsive thrust). Low-pressure turbine 118 may drive fan 138 via low-pressure spool 180. High-pressure turbine 117 may drive high-pressure compressor 114 via high-pressure spool 181.

While illustrated and described as a multi-shaft design, turbine engine 100 is not so limited. For instance, in some examples, turbine engine 100 may be a single shaft design (e.g., without separate HP/LP spools). Similarly, aspects of this disclosure are applicable to turbine engines of all ranges of thrust and sizes.

As noted above, fan 138 may be rotated using energy collected via low-pressure turbine 118 (e.g., a power-turbine). As shown in FIG. 1, fan 138 may include a plurality of fan blades 128 connected to hub 140. Fan 138 may be circumferentially surrounded by a structural member in the form of a fan casing 124 (e.g., where turbine engine 100 is a ducted turbo-fan engine), which may be connected to an annular array of outlet guide vanes (not shown). Fan casing 124 may comprise a rigid containment casing 125 and attached rearwardly thereto is a rear fan casing. As shown in FIG. 1, fan 138 (and/or other components of the engine core such as high-pressure compressor 114) may be connected to core vane assembly 135. Core vane assembly 135 may include core vanes (not shown). The core vanes may provide several functions. For instance, in addition to or in place of supporting fan 138, the core vanes may be shaped and arranged to straighten core airflow C before it reaches high-pressure compressor 114. While illustrated in FIG. 1 as being a directly driven fan, in other examples fan 138 may be a geared turbofan. For instance, turbine engine 100 may include a gearbox mechanically between low-pressure turbine 118 and fan 138.

One or more components of turbine engine 100 may be considered to form a core section. For instance, high-pressure compressor 114 (and an additional intermediate-pressure compressor in a three-spool turbine engine) may form compressor section 142, and turbines 117, 118 may form turbine section 146. In some examples, the core section may be considered to be made up of high-pressure compressor 114, combustor 116, and high-pressure turbine 117. In other words, the core section may include only the high-pressure sections of turbine engine 100.

Casing 141 may surround core the core section and bifurcate inlet airflow A into bypass airflow B and core airflow C. Casing 141 may include one or more layers configured to serve different purposes. Casing 141 may be surrounded by fairing 147. Fairing 147 may be a housing which includes a smooth radially outer surface, which may improve the aerodynamic performance of turbine engine 100.

For example, casing 141 may include a liner layer configured to stop a broken blade from a compressor or turbine from projecting through casing 141 and damaging portions of turbine engine 100. Casing 141 may include one or more structures connected to and considered part of casing 141. For example, a core vane assembly and/or core exhaust nozzle 120 may be considered as different parts of the overall casing 141. Casing 141 may include splitter casing 143 and core casing 145. Splitter casing 143 may be formed fore of high-pressure compressor 114 and aft of fan 113, and may bifurcate inlet airflow A into core airflow C and bypass airflow B. Core casing 145 may surround core section 146. In some examples, splitter casing 143 may be directly connected to core casing 145. Alternatively, one or more intervening components may be included. For example, an intermediate casing may be positioned between splitter casing 143 and core casing 145.

In some examples, splitter casing 143 and/or core casing 145 may be formed all in one segment along the entire axial length, such that casing 141 is formed integrally as a complete casing. In other examples, either or both of splitter casing 143 or core casing 145 or may be broken up into different portions along the axial length. In examples where splitter casing 143 includes more than one portion, the different portions of splitter casing 143 may include different sizes (e.g., diameters), layers, and materials, each configured to selectively tailor the properties of splitter casing 143.

In accordance with one or more examples of the present disclosure, turbine engine 100 may include electrical generator 132 positioned (e.g., axially positioned) in compressor section 142. In the illustrated example of two-spool turbine engine 100 where compressor section 142 includes only high-pressure compressor 114, electrical generator 132 may be axially positioned within high-pressure compressor 114. In other examples, such as in a three-spool engine which includes an intermediate-pressure compressor as well as a high-pressure compressor, an electrical generator may be positioned axially within the intermediate pressure compressor or the high-pressure compressor, although elevated temperatures in the high-pressure compressor may make the high-pressure compressor position more challenging.

Electrical generator 132 includes rotor 152 which is mechanically rotated by a plurality of compressor blades of a compressor stage of high-pressure compressor 114. For example, as illustrated, first stage 103 of high-pressure compressor 114 may carry rotor 152 of electrical generator 132 on an outer diameter of the plurality of compressor blades. The outer diameter may, in some examples, be the tip of the compressor blades, but is not so limited. For example, the outer diameter may mean that the radial center of rotor 152 is on the radially outer half of the compressor blades of first stage 103. Furthermore, as primarily described herein, electrical generator 132 is integrated into first stage 103 of high-pressure compressor 114. However, in some examples, electrical generator 132 may be integrated into another compressor stage of high-pressure compressor 114.

Rotation of the plurality of compressor blades of first stage 103 during operation of turbine engine 100 may cause rotation of rotor 152, which is attached to or integral with the compressor blades. Electrical generator 132 further includes stator 150. At least a portion of stator 150 may be integrated into casing 141, such as in splitter casing 143, at the same axial position as rotor 152. Stator 150 may thus be stationary relative to turbine engine 100. The relative rotation of rotor 152 to stator 150 may enable electrical generator 132 to generate electrical energy.

Electrical generator 132 may be any type of electrical generator. Examples of electrical generator 132 include, but are not limited to, alternators, dynamos, permanent magnet generators, field wound generators, synchronous, asynchronous, brushed, brushless, etc.

Rotor 152 and stator 150 of electrical generator 132 may be concentric with LP spool 180 and/or HP spool 181, and thus may be concentric with high-pressure compressor 114 and fan 138. Positioning electrical generator 132 axially in compressor section 142 may provide various advantages (e.g., over tail cone or external positions). For instance, temperatures in such a space may be relatively low when compared to positions further aft, which may improve performance of electrical generator 132 (e.g., as performance of electrical generators may degrade when heated).

Still further advantages may be gained by positioning electrical generator 132 in compressor section 142, when compared to positioning electrical generator 132 elsewhere. For example, the number of components making up electrical generator 132 may be reduced. High-pressure compressor 114 may include a plurality of stages, and each stage of the plurality of stages may include a plurality of compressor blades. The plurality of compressor blades of a stage (e.g., of first stage 103) may serve the dual-purpose of driving the rotation of rotor 152 of electrical generator 132 and compressing core airflow C. In this way, redundancy of components may be reduced, and electrical generator 132 may generate electricity while simultaneously adding relatively little weight to turbine engine 100.

Although locating electrical generator 132 in a location in compressor section 142 may provide improved performance of electrical generator 132 relative to downstream or external locations, as discussed above, still further performance improvements may be desirable. For example, where the stator cooling of electrical generator 132 is located within core airflow C (e.g., entirely within core airflow C), the heat from the stator of electrical generator 132 may raise the temperature of core airflow C such that performance of turbine engine 100 is degraded. As core airflow C travels axially downstream, core airflow C will be compressed by further stages of high-pressure compressor 114. Generally, in turbine engine 100, an airflow that is warmer requires more work to compress than a relatively cooler airflow. As such, adding heat to core airflow C generated by electrical generator 132 may result in reduced performance of high-pressure compressor 114, and ultimately reduced performance of turbine engine 100. Aspects of the present disclosure relate to arrangements and techniques which may offer improved thermal management. As discussed above, improved thermal management may enable a reduced operating temperature of electrical generator 132 and/or compressor section 142. Thus, aspects of the present disclosure may enable improved performance of electrical generator 132 and/or turbine engine 100.

For example, electrical generator 132 may include stator 150 that is at least partially integrated into casing 141 (e.g., splitter casing 143) and configured to be cooled by bypass airflow B. Accordingly, heat generated by electrical generator 132 may be removed from stator 150, which may increase the performance of electrical generator 132 by reducing the operating temperature of stator 150. The removed heat is rejected into bypass airflow B. Accordingly, performance penalties to downstream compressors and/or compressor stages may be reduced or eliminated. Thus, inclusion of electrical generator 132, which rejects heat into bypass airflow B, may enable improved performance of turbine engine 100 relative to an electrical generator which rejects heat to the core flow or otherwise adds heat to the core of the engine.

In some examples, electrical generator 132 may be positioned at a first stage 103 of a lowest pressure compressor which is downstream of fan 138 (which can be considered a low-pressure compressor). In the illustrated example, first stage 103 of high-pressure compressor 114 is the first compressor stage 103 of. Integrating electrical generator 132 into the first compressor stage of turbine engine 100 may position electrical generator 132 in the lowest temperature compressor stage of turbine engine 100, where electrical generator 132 may perform better than otherwise possible at any downstream compressor stage.

In some examples, stator 150 may include a stator frame and stator windings, and one or both of the stator frame and stator windings may be integrated into casing 141 and cooled by air from bypass airflow B. Cooling stator 150 with bypass airflow B may reduce an operating temperature of electrical generator 132, which may improve the efficiency of electrical generator 132. In this way, the present disclosure may enable increased energy generation of electrical generator 132.

Figure 2:
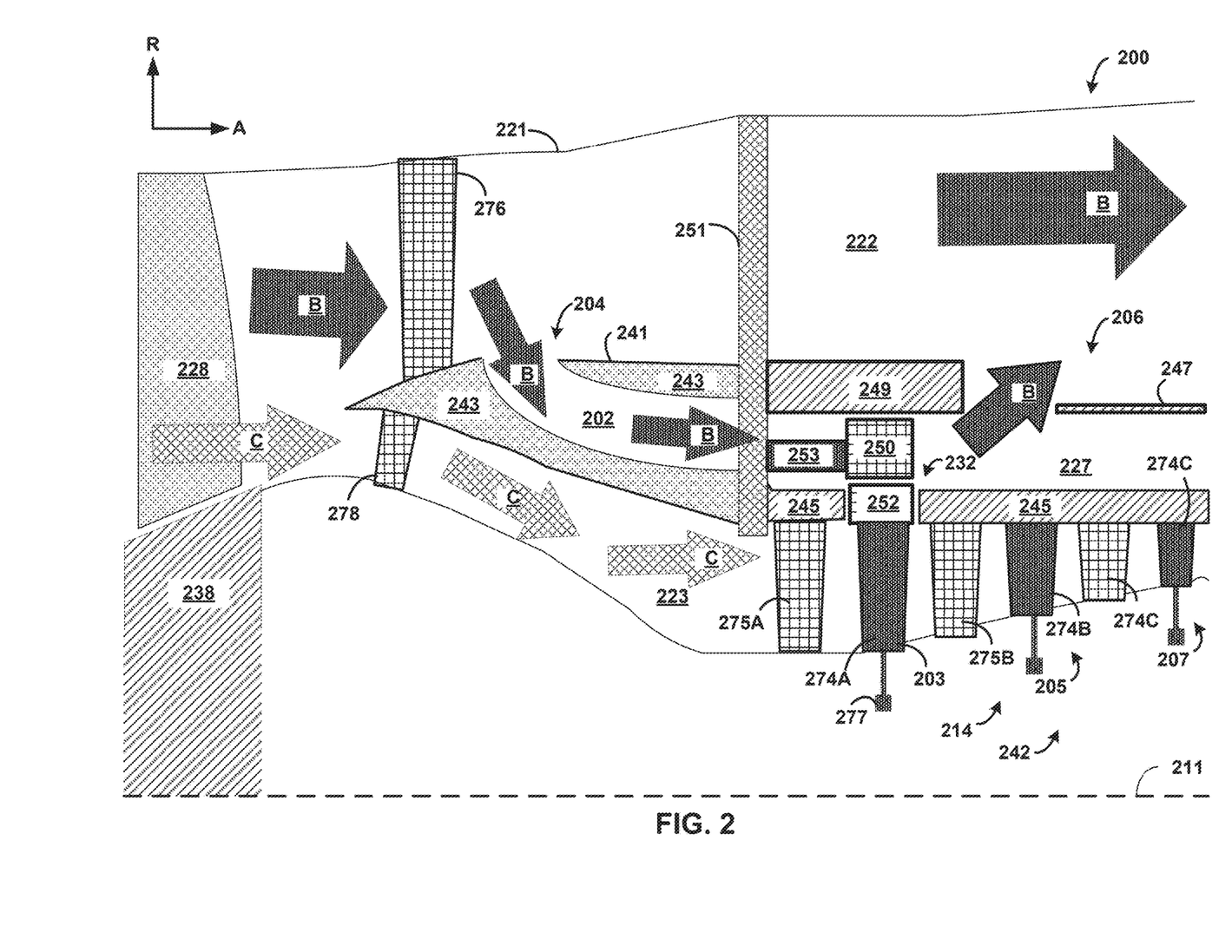
FIG. 2 is a conceptual diagram illustrating further details of a portion of turbine engine 100, in accordance with one or more aspects of the present disclosure.

FIG. 2 a conceptual diagram illustrating further details of example turbine engine 200. Turbine engine 200 may be an example of a portion of turbine engine 100 of FIG. 1, except where differing as described below. Similar reference numerals indicate similar elements.

Turbine engine 200 includes fan 238 axially positioned in an axially forward position. Fan 238 includes a plurality of fan blades including fan blade 228, which rotate around longitudinal axis 211 in operation. Air flowing past fan 238 is bifurcated by splitter casing 243 of casing 241 into core airflow C ("C" arrows) and bypass airflow B ("B" arrows).

Core airflow C may flow through core duct 223 during operation. Core duct 223 routes core airflow C past one or more core inlet guide vanes 278. Core inlet guide vane 278 is configured to straighten or otherwise prepare core airflow C for compression by high-pressure compressor 214 in compressor section 242. High-pressure compressor 214 includes first compressor stage 203, second compressor stage 205, and third compressor stage 207, and may include subsequent stages (not pictured). Each stage may include a plurality of compressor blades mounted on a disk. For example, first stage 203 may include compressor blade 274A, second compressor stage 205 may include compressor blade 274B, and third compressor stage 207 may include compressor blade 274C.

In operation, first compressor stage 203 may rotate (e.g., on bearing 277) to compressor core airflow C. Core airflow C may be further compressed by second stage 205, third stage 207, and any other stages of high-pressure compressor 214, before combustion and expansion through turbine stages as described above. In some examples, as illustrated, each compressor stage may include a corresponding stage of compressor vanes includes first compressor vane 275A, second compressor vane 275B, and compressor vane 275C (collectively, "compressor vanes 275"). Compressor vanes 275 may be not rotate during operation of turbine engine 200. Instead, compressor vanes 275 may function to straighten core airflow C in preparation for compression by the subsequent compressor stage.

Bypass airflow by may flow through bypass duct 222 after being accelerated by fan 238. Bypass duct 222 may be defined by casing 241 at the radially inner side and nacelle 221 at the radially outer side. Bypass airflow B may provide a majority of thrust for the aircraft. Bypass duct 222 may include one or more inlet guide vanes 276 and/or one or more mechanical struts 251. Mechanical struts 251 may structurally support the core of turbine engine 200.

Casing 241 separates bypass duct 222 from core duct 223. In the illustrated example, casing 241 includes splitter casing 243 axially fore of core casing 245. In some examples, although not pictured, an intermediate casing may be disposed between splitter casing 243 and core casing 245. Core casing 245 is surrounded on a radially outer side by fairing 247. Fairing 247 houses core casing 245 and surrounding accessories. As such, fairing 247 may provide a smooth aerodynamic surface for bypass airflow B to flow over, which may reduce drag. In some examples, void space 223 may be disposed between core casing 245 and fairing 247.

Turbine engine 200 includes electrical generator 232. Electrical generator includes rotor 252 and stator 250. Rotor 252 may be attached to or integral with compressor blade 274A (e.g., on a radially outer portion of compressor blade 274A) of first compressor stage 203. Rotation of first compressor stage 203 during operation of turbine engine 200 may cause rotation of rotor 252 relative to stator 250 to generate electrical power. In some examples, electrical generator 232 may be protected on a radially outer side by generator casing 249.

In some examples, stator 250 may be positioned radially outside of core duct 223. For example, stator 250 may be positioned in void space 227 between core casing 245 and fairing 247. Positioning stator 250 outside of core duct 223 may advantageously utilize available volume in void space 227, which may otherwise not be used. Stator 250 may be mounted on mechanical strut 251, for example using one or more support arms 253.

One or more portions of electrical generator 232 may be cooled by bypass airflow B during operation. For example, turbine engine 200 may define casing duct 202 which may route a portion of bypass airflow B through inlet 204, across stator 250, into void space 227, and out of outlet 206 back into bypass duct 222. In some examples, casing duct 202 may be formed at least partially by splitter casing 243. For example, inlet 204 may be located at the leading edge (e.g., axially forward-most point) of splitter casing 243, or may be located further downstream into bypass duct 222, as illustrated.

Outlet 206 fluidically connects cooling airflow from bypass airflow B back to bypass duct 222 after the cooling airflow flows across electrical generator 232. In some examples, outlet 206 may be arranged as one or more apertures in fairing 247 fluidically connecting void space 227 to bypass duct 222. Electrical generator 232 may be integrated into core casing 245 such that a seal is formed which retains core airflow C in core duct 223 and prevents bypass airflow B from entering core airflow C. In this way, electrical generator 232 may be cooled by bypass airflow B without unnecessarily detrimentally impacting the performance of high-pressure compressor 214.

Figure 3:
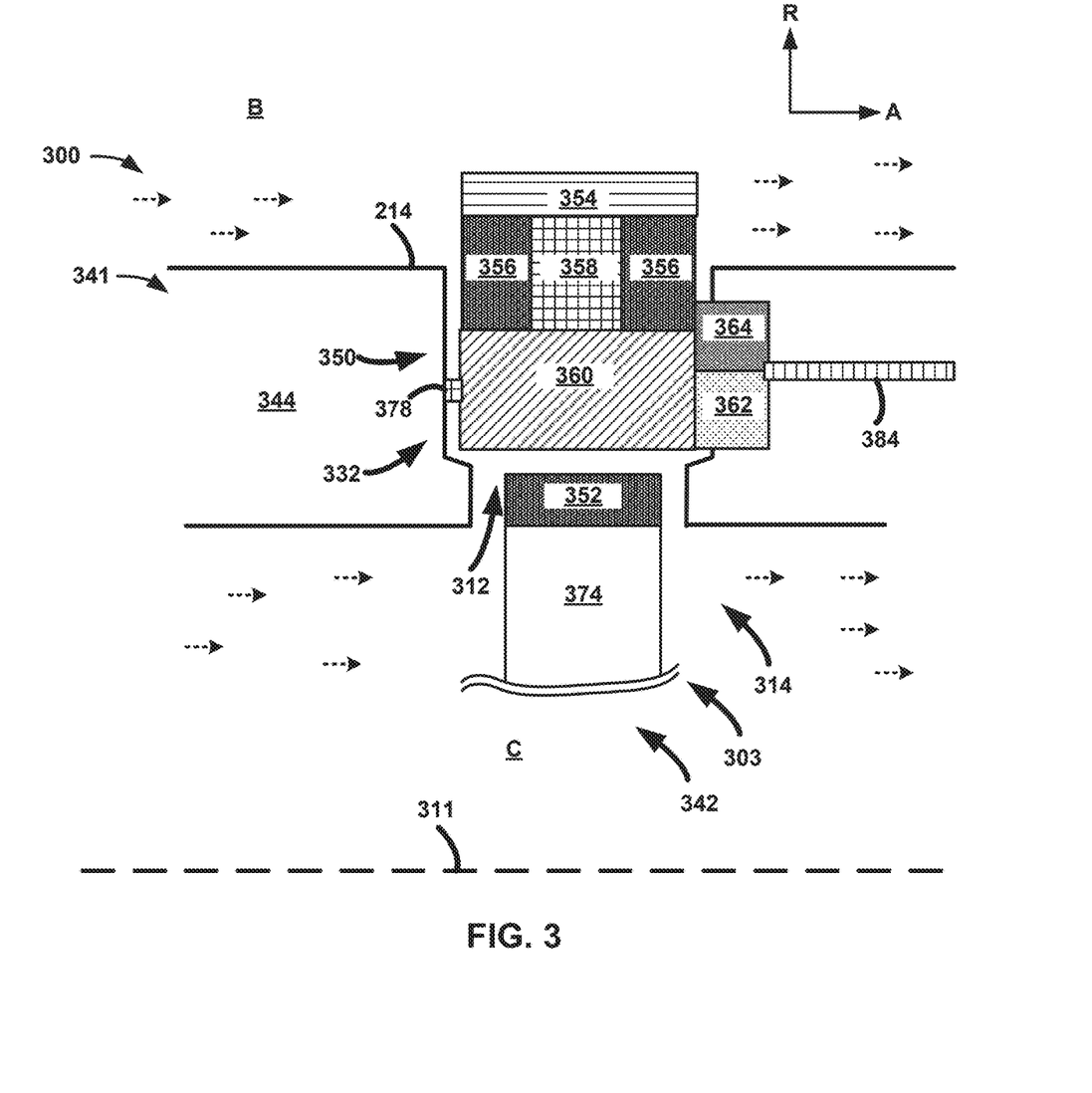
FIG. 3 is a conceptual diagram illustrating further details of an example turbine engine, in accordance with one or more aspects of the present disclosure.

FIG. 3 is a conceptual diagram illustrating further details of example turbine engine 300. Turbine engine 300 may be an example of a portion of turbine engine 100 of FIG. 1, or of turbine engine 200 of FIG. 2, and may generally be described similarly, except where differing as described below. Similar reference numerals indicate similar elements.

Turbine engine 200 includes electrical generator 332, which includes rotor 352 mechanically rotated by a plurality of compressor blades 374 (only a single blade is shown) of compressor stage 203, in accordance with the present disclosure. In this example, electrical generator 232 is integrated into first stage 203 of high-pressure compressor 214. First stage 203 is the lowest-pressure compressor stage of turbine engine 300 downstream of a fan. As such, the temperature of core airflow C may be lower at the illustrated stage than at any point downstream along the axial direction A.

Electrical generator 332 may be an example of electrical generator 132 and/or 232. As shown in FIG. 3, electrical generator 332 includes stator 350 and rotor 352. Stator 350 may include stator frame 354, windings 356, pole 358, and armature 360. Electrical generator 332 may further include commutator 362 and brush 364.

Rotor 352 may rotate about longitudinal axis 311 relative to stator 350. The relative rotation of rotor 352 and stator 350 may generate electrical power. In general, stator frame 354 may mechanically support one or more other components of stator 350, such as windings 356, and pole 358. Power generated by electrical generator 332 may be carried through conductors 384, which may be routed through any suitable pathway. As one example, conductors 384 may be disposed in a strut (e.g., strut 251 of FIG. 2). Conductors 384 are configured to carry electrical power generated by electrical generator 332. In this way, conductors 384 may transport the power generated by electrical generator 332 out of compressor section 342).

When turbine engine 300 is operating, each stage, including first stage 303 of the compressors (high-pressure compressor 114, FIG. 1) of compressor section 342 rotates, inputting mechanical work to compress core airflow C. In accordance with one or more aspects of this disclosure, a plurality of compressor blades (only compressor blade 374 is illustrated) of stage 303 may mechanically rotate rotor 352 of electrical generator 332. For example, rotor 352 of electrical generator 332 may be attached to or integral with compressor blade 374, and thus be directly driven by compressor blade 374. For example, rotor 352 may be a hoop rim mounted to the tips and surrounding first stage 303 of compressor section 342, as will be further described below. As such, in operation, compressor blade 374 is a dual-purpose blade that both inputs work to compress core airflow C and drives rotor 352 to rotate relative to stator 350. In some examples, as illustrated, stator 350 is positioned radially outside of rotor 352.

Compressor blade 374 may carry rotor 352 on an outer diameter of compressor blade 374. Put differently, rotor 352 may be positioned radially more distant from longitudinal axis 311 than a majority of compressor blade 374. The outer diameter may, in some examples, be the tip of compressor blade 374, as illustrated. However, in other examples, rotor 352 may not be located at the tip of compressor blade 374, but rather the center of rotor 352 may be positioned on the outer half of compressor blade 374. Furthermore, as primarily described herein, electrical generator 332 is integrated into first stage 303 of high-pressure compressor 314. However, in some examples, electrical generator 332 may be integrated into another compressor stage of high-pressure compressor 314, or may be integrated into an intermediate-pressure compressor (in a three-spool turbine engine).

In some examples, rotor 352 may be directly attached to compressor blade 374. In some examples, rotor 352 may be part of compressor blade 374 (e.g., as one or more magnets attached to or formed integrally with compressor blade 374). In some examples, rotor 352 may be a discrete component attached to compressor blade 374. For example, rotor 352 may be a hoop rim. The hoop rim may be an annular ring which includes one or more magnets, and the hoop rim may be attached to the tips of the plurality of compressor blades of a compressor stage. In some examples, the hoop rim may completely circumferentially surround first stage 303 at a radially outer position (e.g., the tips of compressor blades 374 of first stage 303).

In some examples, first stage 303 may be the only stage of high-pressure compressor 314. In such examples, compressor blades 374 may be arranged in a single row (e.g., at the same axial position). In some examples, first stage 303 may be a first stage of high-pressure compressor 314, which may be a multiple stage compressor section. In some examples, compressor blades 374 may be arranged in multiple rows (e.g., axially displaced along longitudinal axis 111).

Compressor section 342 may be surrounded by casing 341 (e.g., core casing 145, FIG. 1). In the illustrated example of FIG. 3, casing 241 may include casing wall 244. Radially outside of casing wall 244 may be bypass airflow B, and radially inside of casing wall 244 may be core airflow C. Although the illustrated example includes a relatively simple casing 241 including only casing wall 244, in some examples, casing 241 may include more layers, or may include axial segments as different portions of casing 241.

Components of electrical generator 332 may generate heat during operation. For example, stator windings 356 may generate heat (e.g., due to eddy currents). As electrical generator 332 may operate more efficiently at lower temperatures, it may be desirable to remove heat (i.e., cool) from electrical generator 332. Aspects of this disclosure may enable beneficial cooling of electrical generator 232. For instance, in accordance with the present disclosure, at least a portion of stator 350 may be integrated into casing 141 (e.g., splitter casing 143 or core casing 145 of FIG. 1) and cooled by bypass airflow B. Since rejecting heat to bypass airflow B may reduce or eliminate the addition of heat to core airflow C which would then need to be compressed before combustion, electrical generator 332 of the present disclosure may be operated to produce more power than other similarly-located generators, because the heat can be rejected to bypass airflow B rather than core airflow C. Furthermore, the relatively cool air from bypass airflow B may maintain or reduce an operating temperature of electrical generator 332 to below a threshold operating temperature, above which the performance of generator 332 is degraded.

In some examples, stator 350 may be considered integral with casing 241 when it forms part of casing 241 (e.g., replaces all or a part of an axial section of casing wall 344). In some examples, components of electrical generator 332 may be separated from casing wall 344 of casing 241 by gap 312. One or more airtight sealing members 378 may be positioned between components of electrical generator 332 (e.g., stator 350 and/or rotor 352) and prevent crossover of core airflow B and bypass airflow C.

In some examples, stator 350 may be considered integral with casing 241 when a portion of stator 350 is attached casing wall 244 or located radially outside of casing wall 244. For example, stator 350 may extend radially from casing wall 244 in compressor section 242 into bypass airflow B, as shown in FIG. 3, or may be located entirely radially outside of casing wall 244, as shown in FIG. 2. Put differently, stator 350 (e.g., one or more of stator frame 354, windings 356, or pole 358) may protrude into bypass airflow B from casing 341 such that stator 350 is exposed to the passing air and consequently cooled, and the thermal energy is rejected into bypass airflow B.

Bypass air B may thus flow over stator 350 and may cool electrical generator 332. Bypass airflow B may conduct heat from operation of electrical generator 332 into bypass airflow B, such as by radiation, convection, and/or conduction. With the cooling provided by bypass airflow B, aspects of this disclosure may allow for higher power extraction by electrical generator 332 (e.g., through thermal management). Another benefit that the arrangements of this disclosure may provide is a simpler system without separate or active thermal management (such as oil cooling or refrigerant, etc.). For instance, this disclosure enables cooling without using pumps or moving parts, which may be attractive in certain applications.

Figure 4:
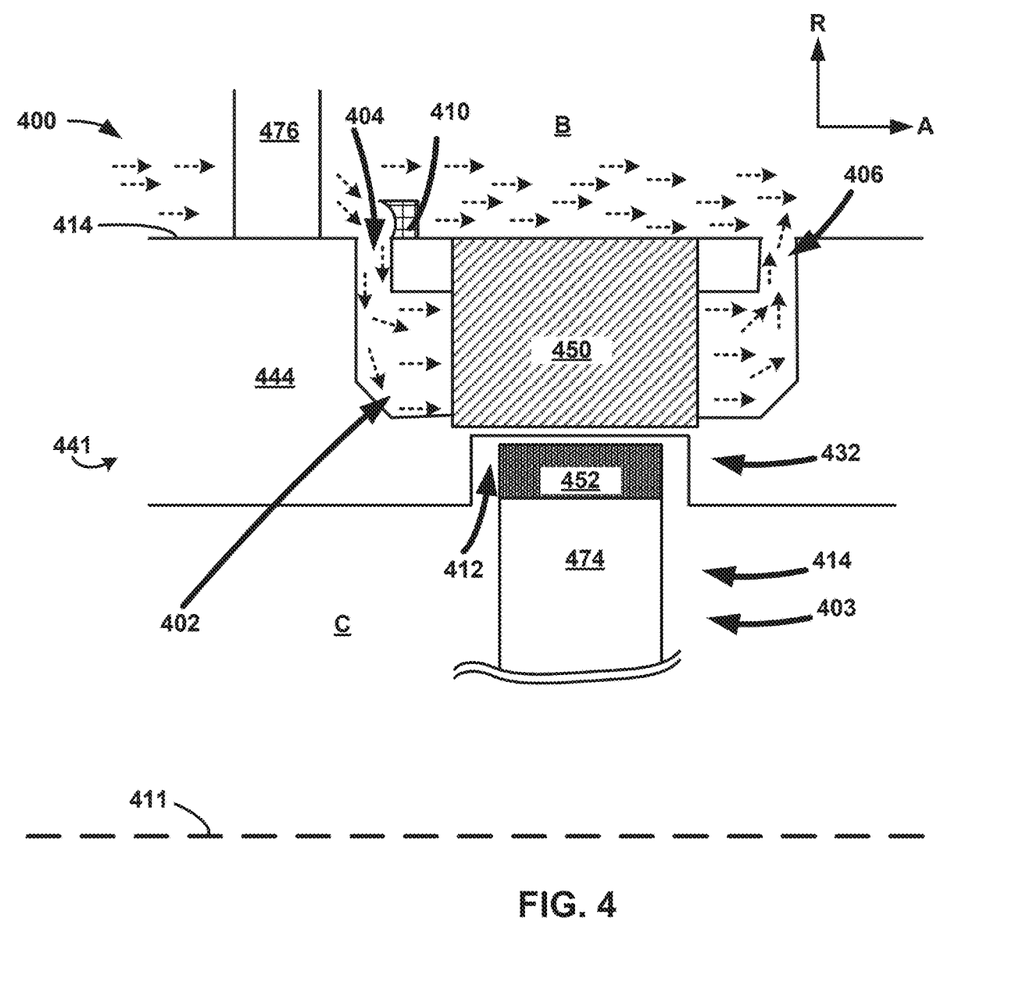
FIG. 4 is a conceptual diagram illustrating further details of an example turbine engine, in accordance with one or more aspects of the present disclosure.

FIG. 4 is a conceptual diagram illustrating further details of one example of turbine engine 400, with electrical generator 432 having rotor 452 which is mechanically rotated by compressor blade 474 of compressor stage 403, in accordance with one or more aspects of this disclosure. Turbine engine 400 may be an example of turbine engine 100 of FIG. 1, turbine engine 200 of FIG. 2, or turbine engine 300 of FIG. 3, where similar reference numerals indicate similar elements.

As illustrated, rather than protruding into bypass airflow B as shown in FIG. 3, in some examples electrical generators of the present disclosure need not protrude into bypass airflow B beyond casing wall 444. For example, electrical generator 432 is integrated into casing wall 444 of casing 441, and bypass air from bypass airflow B may be routed to stator 350.

Electrical generator 432 includes stator 450 and rotor 452. Stator 450 and rotor 452 are configured to rotate relative to each other to generate electrical power. For example, rotor 452 may rotate about longitudinal axis 411. In the illustrated example of FIG. 4, stator 450 is completely integrated into casing wall 444. Casing wall 444 and stator 450 (e.g., stator frame and/or stator windings) have a profiled surface to match casing wall 444, such that gas-washed surface 414 of casing 441 includes a portion of both casing wall 444 and stator 450. Put differently, gas-washed surface 414 is smooth and matches across casing wall 444 and stator 450. To increase the cooling of bypass air (illustrated by the short dashed arrows), casing 441 may include casing duct 402. In some examples, casing duct 402 may be positioned downstream of guide vane 476.

Casing duct 402 may be configured to fluidically couple the stator windings of stator 450, which generate heat during operation of electrical generator 432, with the relatively cool air of bypass airflow B. As such, casing duct 402 may include an inlet 404. Air scoop 410 may optionally be included on gas washed surface 414 to urge bypass air into casing duct 402. After flowing over hot portions of stator 450 (e.g., stator windings), bypass air in casing duct 402 may be outlet to bypass airflow B through outlet 406. Fluidically coupled to bypass airflow B in this way, electrical generator 432 may reject thermal energy into bypass airflow B rather than core airflow C, which may advantageously reduce deleterious impacts to compressor performance.

In the illustrated example of FIG. 4, rotor 452 is attached or formed at the tip of compressor blades 474. In some examples, rotor 452 may be configured to rotate within recess 412 formed in casing wall 444, which may increase efficiency of electrical generator 432 and/or turbine engine 400 by increasing electrical communication of rotor 452 to stator 450 by decreasing the distance between the components and eliminating or removing intervening materials.

Figure 5:
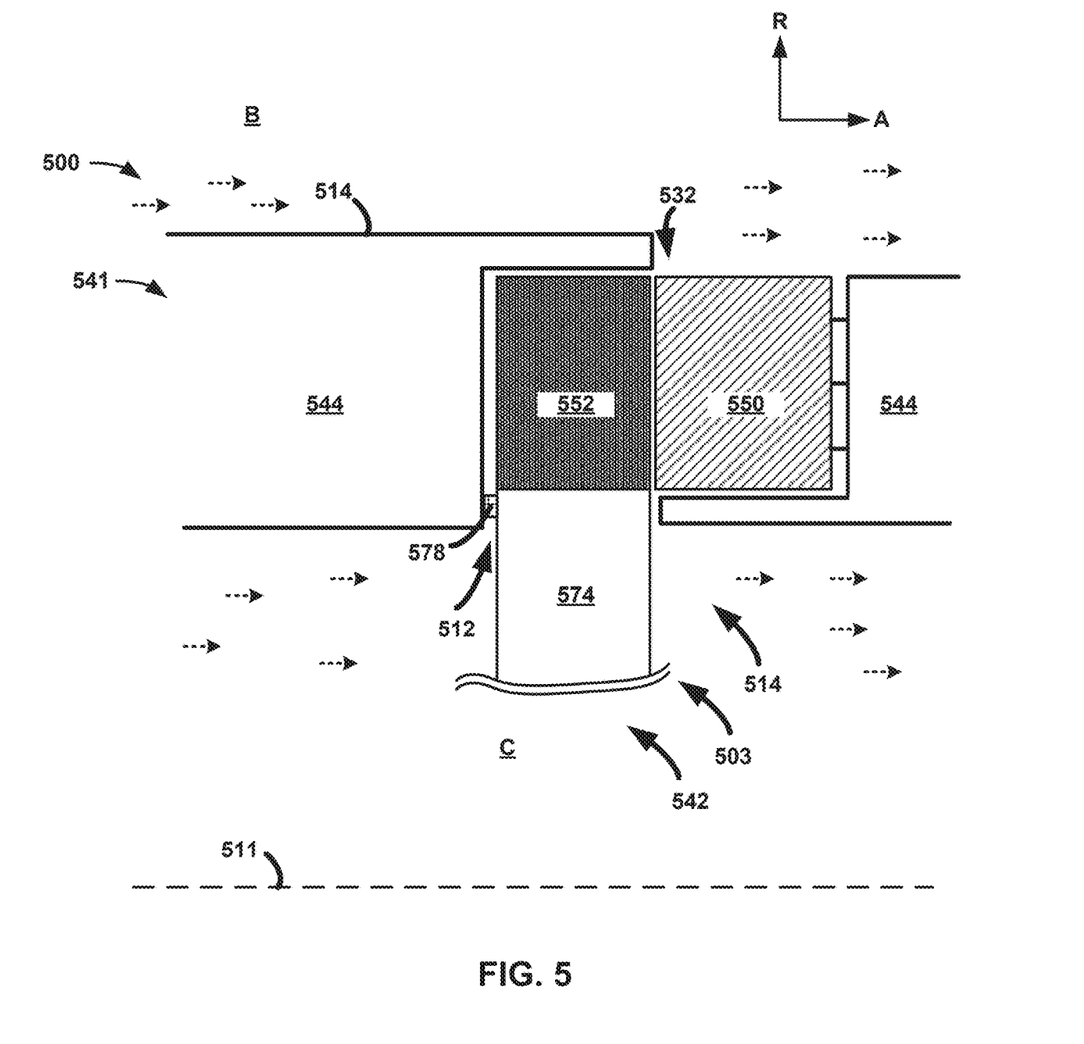
FIG. 5 is a conceptual diagram illustrating further details of an example turbine engine, in accordance with one or more aspects of the present disclosure.

FIG. 5 is a conceptual cross-sectional diagram illustrating another example of a turbine engine. Turbine engine 500 includes electrical generator 532 positioned in compressor section 542. Electrical generator 532 includes rotor 552, which is mechanically rotated by compressor blade 574 of compressor stage 503, in accordance with one or more examples of the present disclosure. Turbine engine 500 may be an example of turbine engine 100 of FIG. 1, turbine engine 200 of FIG. 2, turbine engine 300 of FIG. 3, or turbine engine 400 of FIG. 4. Turbine engine 500 may generally be described similarly to turbine engine 100 of FIG. 1, except where differing as described below. Similar reference numerals indicate similar elements.

In some examples, as illustrated, rotor 552 and stator 550 of electrical generator 532 may be separated axially in addition to or rather than radially. In such examples, stator 550 may be positioned axially adjacent to rotor 552. In such examples, rotor 552 may be positioned at a tip (e.g., radially outermost portion) of compressor blade 574. In such examples, rotor 552 may extend through casing wall 544 such that rotor 552 may be cooled by bypass airflow B, which may advantageously reject thermal energy from rotor 552 into bypass airflow B. In some examples, one or more sealing members 578 may be included to reduce crossover of the airflows. Furthermore, in some examples, casing wall 544 may extend across rotor 552 on the radially outer side as a casing for compressor blade 574. Similarly, casing wall 544, which defines gas-washed surface 514, may extend across stator 550 on the radially inner side to contain core airflow C, preventing core airflow C from flowing radially through stator 550 (e.g., through stator windings) into bypass airflow B and reducing compressor efficiency. Electrical generator 532 may be integrated into casing 541 such that gap 512 may accommodate expansion and contraction of components during at least some operating modes of turbine engine 500 and electrical generator 532.

Figure 6:
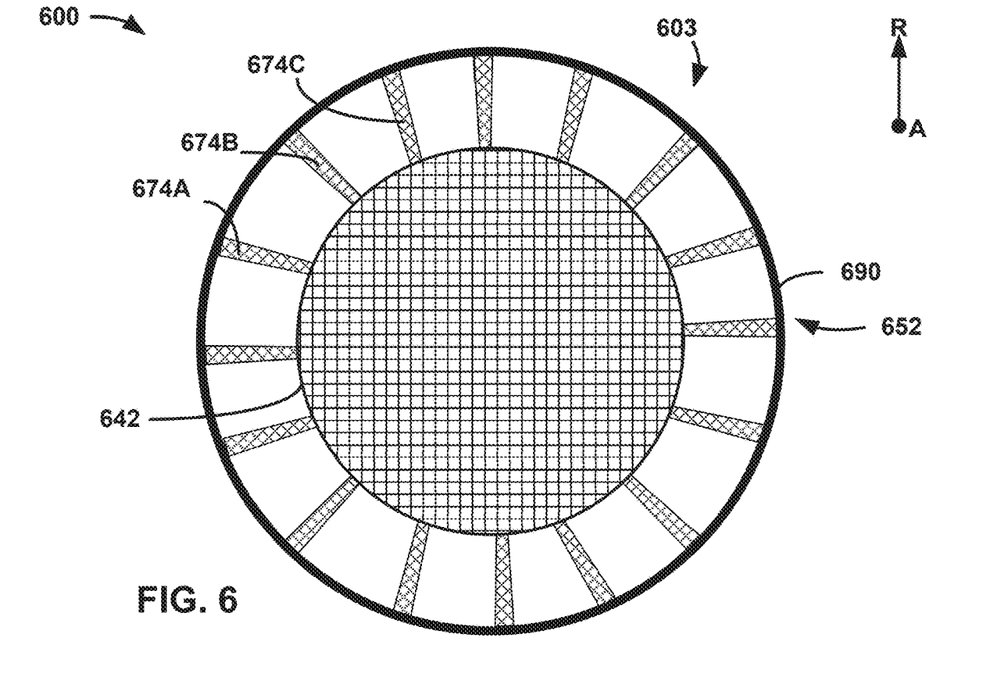
FIG. 6 is a conceptual diagram illustrating a portion of an example generator which includes a hoop-rim rotor, in accordance with one or more aspects of the present disclosure.

FIG. 6 is a conceptual diagram illustrating a portion of an example turbine engine 600. Turbine engine 600 is illustrated in a front view, such that longitudinal axis (111, FIG. 1) runs into and out of the page. Turbine 600 of FIG. 6 may be an example of turbine engine 100 of FIG. 1, turbine engine 200 of FIG. 2, turbine engine 300 of FIG. 3, turbine engine 400 of FIG. 4, or turbine engine 500 of FIG. 5, and may be generally described similarly, except where differing as described below. Similar reference numerals indicate similar elements. Turbine engine 600 includes compressor stage 603. Compressor stage 603 includes compressor blades 674A, 674B, 675C (collectively "compressor blades 674"). Compressor blades 674 are distributed about the central longitudinal axis of turbine engine 600, projecting outward from inner hub 642. Plurality of compressor blades 674 may mechanically support rotor 652 at a radially outward position (e.g., the tips of plurality of compressor blades 674). In some examples, rotor 652 is configured as a hoop rim 690. Hoop rim 690 is an annular structure completely circumferentially surrounding compressor stage 603 at the radially distal end of plurality of compressor blades 674. Hoop rim 690 includes one or more magnets. The one or magnets of hoop rim 690 are configured to electromagnetically interact with the stator (150, FIG. 1) of the electrical generator (132, FIG. 1). In this way, hoop rim 690 is configured as the rotor (152, FIG. 1).

In some examples, hoop rim 690 may be attached to compressor stage 603 as a separate, discrete component (illustrated by the different cross-hatching of compressor blades 674 and hoop rim 690). For example, hoop rim 690 may be slid axially over compressor stage 603 and welded or brazed to join the components.

Figure 7:
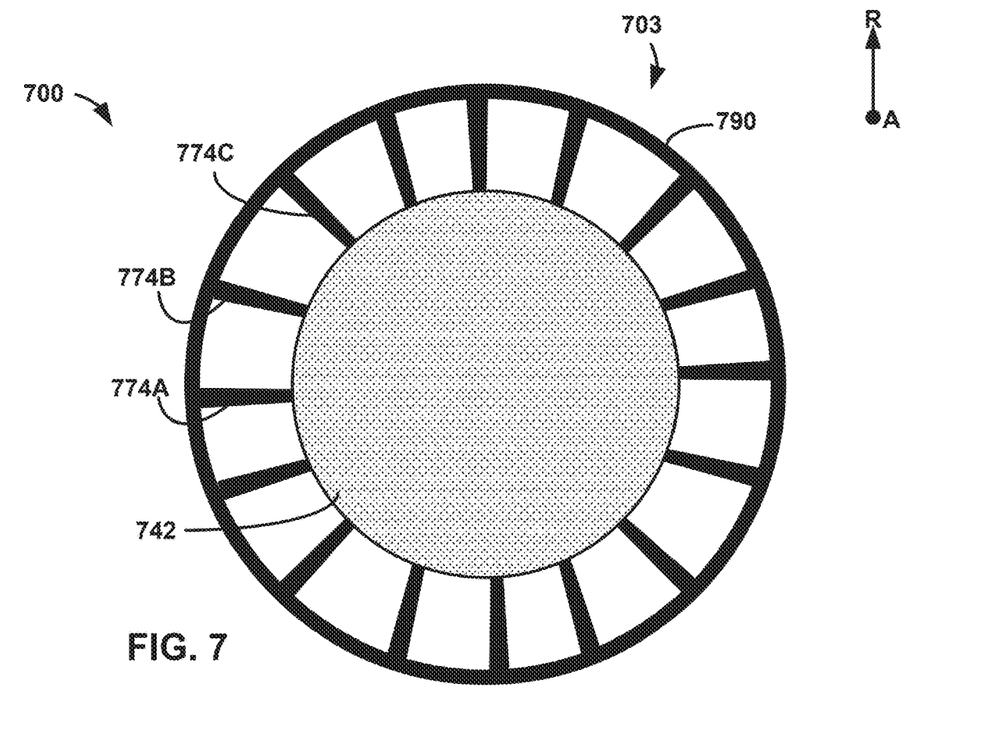
FIG. 7 is a conceptual diagram illustrating a portion of an example generator which includes a hoop-rim rotor, in accordance with one or more aspects of the present disclosure.

FIG. 7 is a conceptual diagram illustrating a portion of an example turbine engine 700. Turbine engine 700 is illustrated in a front view, such that longitudinal axis (111, FIG. 1) runs into and out of the page. Turbine 700 of FIG. 7 may be an example of turbine engine 600 of FIG. 6, and may be generally described similarly, except where differing as described below. Similar reference numerals indicate similar elements.

Unlike compressor blades 674 and hoop rim 690 of FIG. 6, which are separate components, turbine 700 of FIG. 7 includes compressor section 742. Compressor section 742 includes stage 704 which includes plurality of compressor blades 774 and hoop rim 790 formed integrally in one piece (illustrated as uniform in color). As such, in some examples, hoop rim 790 and plurality of compressor blades 774 may be machined from a single piece of metal or alloy.

Figure 8:
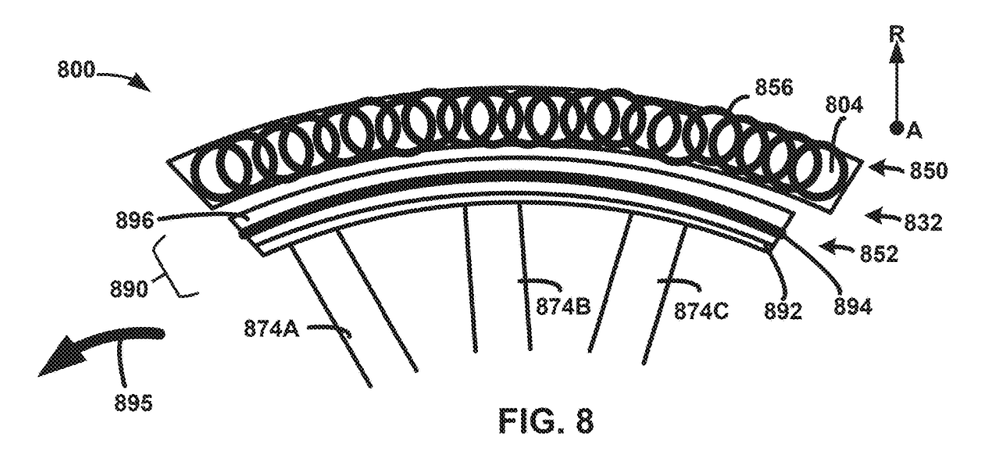
FIG. 8 is a conceptual diagram illustrating a portion of an example generator which includes a hoop-rim rotor, in accordance with one or more aspects of the present disclosure.

FIG. 8 is a conceptual diagram illustrating a portion of an example turbine engine 800. Turbine engine 800 is illustrated in a front view, such that longitudinal axis (111, FIG. 1) runs into and out of the page. Turbine engine 800 may be an example of turbine engine 100 of FIGS. 1, turbine engine 200 of FIG. 2, turbine engine 300 of FIG. 3, turbine engine 400 of FIG. 4, turbine engine 500 of FIG. 5, turbine engine 600 of FIG. 6, or turbine engine 700 of FIG. 7, and may be generally described similarly, except where differing as described below. Similar reference numerals indicate similar elements.

Turbine engine 800 includes electrical generator 832. Electrical generator 832 includes stator 850 and rotor 852. Rotor 852 is configured to rotate about the longitudinal axis in the direction of arrow 895 while stator 850 remains motionless relative to turbine engine 800, at least partially integrated into casing (141, FIG. 1). The relative rotation of rotor 852 to stator 850 may produce electricity. Stator 850 includes stator windings 856 wound about the stator frame. Stator windings 856 may be encased or mechanically supported by glass composite sleeve 804.

Rotor 852 is a hoop-rim rotor. As such, hoop rim 890 is mounted to the tips of compressor blades 874A, 874B, 874C (collectively "compressor blades 874") of a compressor stage (e.g., of high-pressure compressor 114 (FIG. 1)) and completely surrounds longitudinal axis 111 (FIG. 1). Hoop rim 890 may be configured to fit into a recess (312, FIG. 3) of a casing wall (344, FIG. 3) of a casing (341, FIG. 3). Hoop rim 890 includes one or more magnets 894, composite structure 896, and back iron 892. Hoop rim 890 may completely circumferentially surround the stage (103, FIG. 1) of electrical generator 932 and be mechanically rotated by stage 103 while blades 874 input work into the core airflow (C, FIG. 1) to compress the core airflow.

As illustrated, one or more magnets 894 may be a single, continuous magnet which completely surrounds the longitudinal axis (111, FIG. 1). Where manufacturing or assembly challenges make a continuous magnet difficult, one or more magnets 894 may include a plurality of magnets adjacent to each other around hoop rim 890. Such an arrangement may improve balance and/or performance of electrical generator 832. One or more magnets 894 may include any suitable magnetic material. For example, advanced magnetic materials including samarium cobalt and/or neodymium iron boron may be included in one or more magnets 894.

Composite structure 896 is configured to provide mechanical strength and stiffness to hoop rim 890 and mechanically support one or more magnets 894. In some examples, composite structure 896 may include a carbon fiber wrap, aramid fiber wrap, or other suitable composite structures. In examples where composite structure 896 includes a carbon fiber wrap, the carbon fiber wrap may include woven carbon fibers or disordered carbon fibers surrounding one or more magnets 894. Composite structure 896 may secure one or more magnets 894 in place, while providing lightweight and temperature resistant structure to hoop rim 890.

Back iron 892 is configured to increase the magnetic flux and torque of electrical generator 832. In some examples, back iron 892 may form the return path of flux between one or more magnets 894 and other components of rotor 852. In some examples, back iron 892 may include iron-silicon, a specialty alloy such as iron-cobalt vanadium, another high magnetic saturation alloy, or other materials. Blades 874 and portions of hoop rim 890 may be formed from titanium or another suitable material. Hoop rim 890 may be machined as a single piece or may be assembled from multiple different pieces.

With electrical generator 832 integrated into turbine engine 800 in this way, reliable electrical communication may be enabled between rotor 852 and stator 850. Furthermore, the illustrated arrangement may allow for stator 850 to be cooled by bypass airflow (B, FIG. 1). Thus, turbine engine 800 may provide improved electricity production, improved electrical efficiency, reduced additional weight and space, or other benefits.

Figure 9:
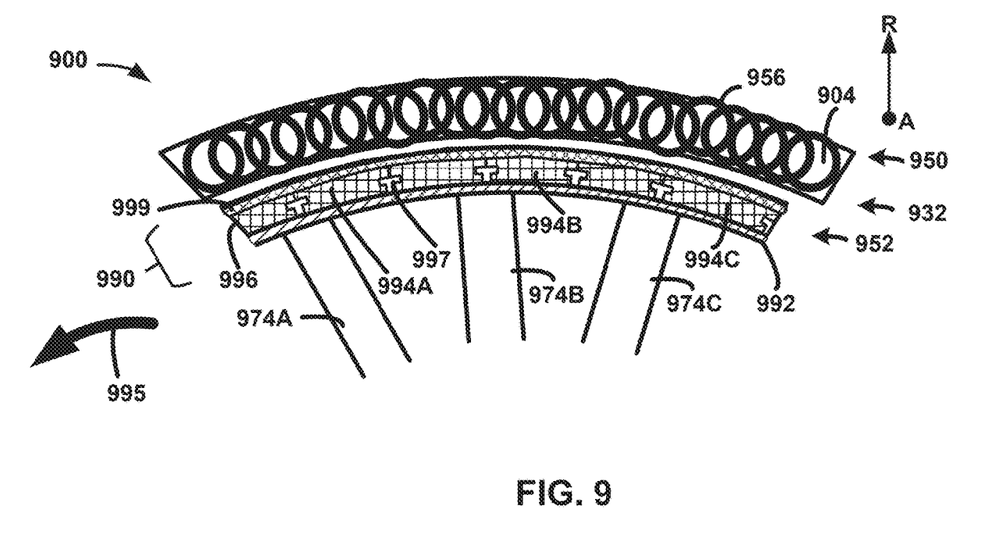
FIG. 9 is a conceptual diagram illustrating a portion of an example generator which includes a hoop-rim rotor which includes one or more retention features, in accordance with one or more aspects of the present disclosure.

FIG. 9 is a conceptual diagram illustrating a portion of an example turbine engine 900. Turbine engine 900 may generally be described similarly to turbine engine 800 of FIG. 8 except where differing as described below. Similar reference numerals indicate similar elements.

Turbine engine 900 includes electrical generator 932. Electrical generator 932 includes stator 950 and rotor 952. Rotor 952 is configured to rotate about the longitudinal axis in the direction of arrow 995 while stator 950 remains motionless relative to turbine engine 900 to produce electricity. Stator 950 includes stator windings 956 wound about the stator frame. Stator windings 956 may be encased in glass composite sleeve 904, either individually as a whole. Stator 950 is configured to be integrated into the splitter casing (143, FIG. 1) of turbine engine 900.

Rotor 952 is a hoop-rim rotor 990, as described above. Hoop rim 990 includes one or more magnets 994, composite structure 996, and back iron 992. Composite structure 996 includes carbon fiber wrap 999.

As illustrated, one or more magnets 994 may include a discrete plurality of magnets 994A, 994B, 994C. In some examples, each magnet of the one or more magnets 994 should be displaced from every other magnet of one or more magnets 994 by the same amount of space, which may be important for balance during operation. in some examples, the number of magnets of one or more magnets 994 may be proportional to the number of compressor blades in compressor blades 974, which include first compressor blade 974A, second compressor blade 974B, and third compressor blade 974C. For example, each blade may have a corresponding magnet, or each blade may correspond to multiple magnets, or a magnet may be positioned every other blade, or the like. Selectively tailoring the number of magnets in one or more magnets 994 may enable performance and/or manufacturing efficiency.

In some examples, composite structure 996 may be shaped to secure magnet 994A within hoop rim 990. For example, composite structure 996 may define retention feature 997. When magnet 994A is slid into place, retention feature 997 radially and circumferentially secures magnet 994A in hoop rim 990. Retention feature 997 may include one or more tabs or protrusions which may increase the surface area of contact between one or magnets 994A and surrounding composite structure 996, which may more securely hold magnet 994A in place during operation. In some examples, an adhesive (e.g., a high-temperature two-part epoxy adhesive) may be included to further secure magnet 994A in position within hoop rim 990. The adhesive may be referred to as an adhesive layer.

In some examples, one or more magnets 994 may be permanent magnets. In or more instances, one or more magnets 994 may be arranged such that they form a Halbach array. Accordingly, one or more magnets 994 may have a spatial rotating pattern of magnetization such that the magnetic field on the radially external side of one or more magnets 994 (e.g., facing stator 950) is relatively large while the magnetic field on the radially inner side (e.g., closer to the central longitudinal axis (111, FIG. 1)) is cancelled such that it is zero or nearly zero.

Figure 10:
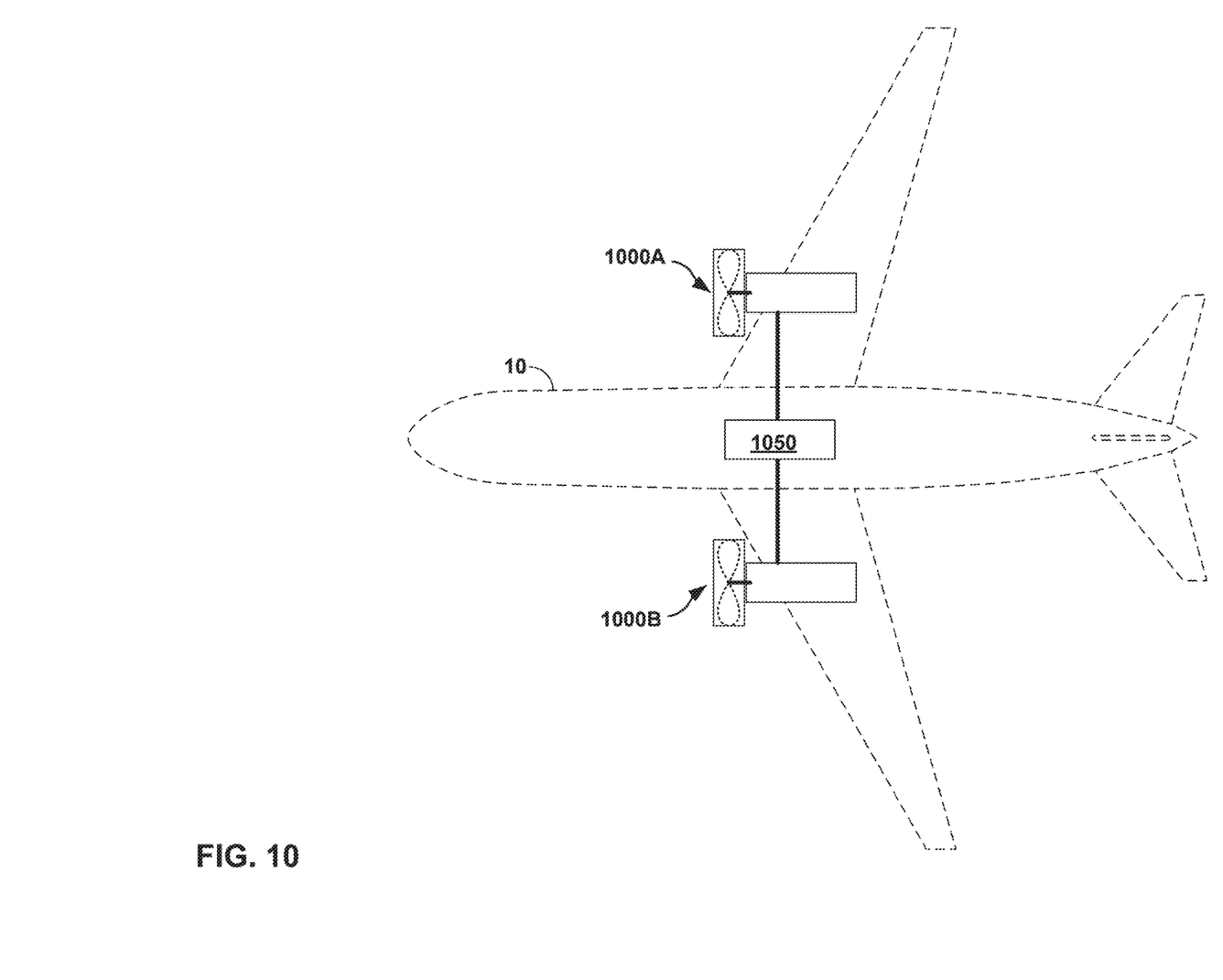
FIG. 10 is a conceptual diagram illustrating an example aircraft, in accordance with one or more aspects of the disclosure.

FIG. 10 is a conceptual diagram illustrating an example aircraft, in accordance with one or more aspects of the disclosure. Aircraft 10 of FIG. 10 may be aircraft that includes one or more turbine engines 1000A and 1000B (collectively, "turbine engines 1000"), which may provide thrust and/or electrical power to aircraft 10. Examples of aircraft 10 include, but are not limited to fixed wing, rotorcraft, vertical takeoff (e.g., VTOL), short takeoff (e.g., STOL), and the like.

Each of turbine engines 1000 may be an example of turbine engine 100 of FIG. 1. As one example, turbine engine 1000A may include an electrical generator having a rotor mechanically rotated by a plurality of compressor blades of a compressor stage.

One or more of turbine engines 1000 may output electrical power to a load of aircraft 10, such as load 1050. In some examples, load 1050 may be a relatively high-power consumption load. As such, it may be desirable to include higher power generation capacity electric machines that can operate with high efficiency without being degraded due to high temperature, such as those described in this disclosure.

The following numbered examples demonstrate one or more aspects of the disclosure.

Example 1: A turbine engine includes at least one turbine; a combustor; at least one compressor, the at least one compressor includes a rotor carried on an outer diameter of the plurality of compressor blades of the compressor stage and mechanically rotated by the plurality of compressor blades of the compressor stage, the rotor configured to rotate about a longitudinal axis of the turbine engine; and a stator.

Example 2: The turbine engine of example 1, wherein the stator is positioned radially outward of the rotor.

Example 3: The turbine engine of any of examples 1 and 2, further comprising a casing, the casing bifurcating an inlet airflow entering the turbine into a bypass airflow and the core airflow.

Example 4: The turbine engine of example 3, wherein at least a portion of the stator is at least partially integrated into the casing or positioned radially outside the casing, wherein the stator is configured to be cooled by the bypass airflow.

Example 5: The turbine engine of any of examples 1 through 4, wherein the compressor stage is a first stage of a first compressor downstream of a fan.

Example 6: The turbine engine of any of examples 4 and 5, wherein the stator includes one or more stator windings mechanically supported by a stator frame, and wherein the one or more stator windings protrude from the casing into the bypass airflow to be cooled by the bypass airflow.

Example 7: The turbine engine of any of examples 4 through 6, wherein the stator includes one or more stator windings mechanically supported by a stator frame, wherein the stator frame is profiled to match the casing wall, and the turbine engine further comprising a casing duct that routes bypass air from the bypass airflow to the stator windings to cool the stator windings.

Example 8: The turbine engine of example 7, wherein the casing duct is outlet into the bypass air flow.

Example 9: The turbine engine of any of examples 1 through 8, wherein the rotor comprises a hoop rim attached to or integral with the plurality of compressor blades of the compressor stage.

Example 10: The turbine engine of example 9, wherein the hoop rim completely circumferentially surrounds the compressor stage.

Example 11: The turbine engine of example 10, wherein the hoop rim includes one or more magnets and a composite structure.

Example 12: The turbine engine of example 11, wherein the one or more magnets include a plurality of magnets, wherein the plurality of magnets includes a first magnet, and wherein the first magnet includes a retention feature to radially secure the magnet in the hoop rim.

Example 13: The turbine engine of example 12, wherein the one or more magnets include a plurality of magnets, and wherein the plurality of magnets define a Halbach array.

Example 14: The turbine engine of any of examples 11 through 13, wherein the hoop rim further comprises a back iron radially inboard of the magnets.

Example 15: The turbine engine of any of examples 1 through 14, wherein the turbine engine is a two-spool turbine engine including a low-pressure spool and a high-pressure spool.

Example 16: The turbine engine of example 15, wherein the electrical generator is concentric with at least one of the low-pressure spool or the high-pressure spool.

Example 17: The turbine engine of example 16, further comprising a fan as a low-pressure compressor driven by the low-pressure spool and a high-pressure compressor driven by the high-pressure spool.

Example 18: The turbine engine of example 17, wherein the electrical generator is axially positioned within the high-pressure compressor.

Example 19: An airframe includes a first turbine engine of one or more turbine engines, the first turbine engine includes at least one turbine; a combustor; at least one compressor, the at least one compressor includes a rotor carried on an outer diameter of the plurality of compressor blades of the compressor stage and mechanically rotated by the plurality of compressor blades of the compressor stage, the rotor configured to rotate about a longitudinal axis of the turbine engine; and a stator.

Example 20: The airframe of example 19, wherein the stator is positioned radially outward of the rotor.

Various examples have been described. These and other examples are within the scope of the following claims.

What is claimed is:

1. A turbine engine comprising:
   at least one turbine;
   a combustor;
   a casing, the casing bifurcating an inlet airflow entering the turbine engine into a bypass airflow and the core airflow;
   at least one compressor, the at least one compressor comprising a compressor stage, wherein the compressor stage includes a plurality of compressor blades configured to input work into a core airflow flowing through the turbine engine; and
   an electrical generator, the electrical generator comprising:

a rotor carried on an outer diameter of the plurality of compressor blades of the compressor stage and mechanically rotated by the plurality of compressor blades of the compressor stage, the rotor configured to rotate about a longitudinal axis of the turbine engine; and a stator, wherein at least a portion of the stator is at least partially integrated into the casing or positioned radially outside the casing, wherein the stator is configured to be cooled by the bypass airflow.

2. The turbine engine of claim 1, wherein the stator is positioned radially outward of the rotor.

3. The turbine engine of claim 1, wherein the compressor stage is a first stage of a first compressor downstream of a fan.

4. The turbine engine of claim 1, wherein the stator includes one or more stator windings mechanically supported by a stator frame, and wherein the one or more stator windings protrude from the casing into the bypass airflow to be cooled by the bypass airflow.

5. The turbine engine of claim 1, wherein the stator includes one or more stator windings mechanically supported by a stator frame, wherein the stator frame is profiled to match the casing wall, and the turbine engine further comprising a casing duct that routes bypass air from the bypass airflow to the stator windings to cool the stator windings.

6. The turbine engine of claim 5, wherein the casing duct is outlet into the bypass air flow.

7. The turbine engine of claim 1, wherein the rotor comprises a hoop rim attached to or integral with the plurality of compressor blades of the compressor stage.

8. The turbine engine of claim 7, wherein the hoop rim completely circumferentially surrounds the compressor stage.

9. The turbine engine of claim 8, wherein the hoop rim includes one or more magnets and a composite structure.

10. The turbine engine of claim 9, wherein the one or more magnets include a plurality of magnets, wherein the plurality of magnets includes a first magnet, and wherein the first magnet includes a retention feature to radially secure the magnet in the hoop rim.

11. The turbine engine of claim 10, wherein the one or more magnets include a plurality of magnets, and wherein the plurality of magnets define a Halbach array.

12. The turbine engine of claim 9, wherein the hoop rim further comprises a back iron radially inboard of the magnets.

13. The turbine engine of claim 1, wherein the turbine engine is a two-spool turbine engine including a low-pressure spool and a high-pressure spool.

14. The turbine engine of claim 13, wherein the electrical generator is concentric with at least one of the low-pressure spool or the high-pressure spool.

15. The turbine engine of claim 14, further comprising a fan as a low-pressure compressor driven by the low-pressure spool and a high-pressure compressor driven by the high-pressure spool.

16. The turbine engine of claim 15, wherein the electrical generator is axially positioned within the high-pressure compressor.

17. An airframe comprising:

a first turbine engine of one or more turbine engines, the first turbine engine comprising:

at least one turbine;

a combustor;

a casing, the casing bifurcating an inlet airflow entering the turbine engine into a bypass airflow and the core airflow;

at least one compressor, the at least one compressor comprising a compressor stage, wherein the compressor stage includes a plurality of compressor blades configured to input work into a core airflow flowing through the turbine engine; and an electrical generator, the electrical generator comprising:

a rotor carried on an outer diameter of the plurality of compressor blades of the compressor stage and mechanically rotated by the plurality of compressor blades of the compressor stage, the rotor configured to rotate about a longitudinal axis of the turbine engine; and a stator, wherein at least a portion of the stator is at least partially integrated into the casing or positioned radially outside the casing, wherein the stator is configured to be cooled by the bypass airflow.

18. The airframe of claim 17, wherein the stator is positioned radially outward of the rotor.

* * * * *